Jan. 7, 1936.  C. W. VAN RANST  2,027,329
MOTOR VEHICLE
Filed Nov. 3, 1934
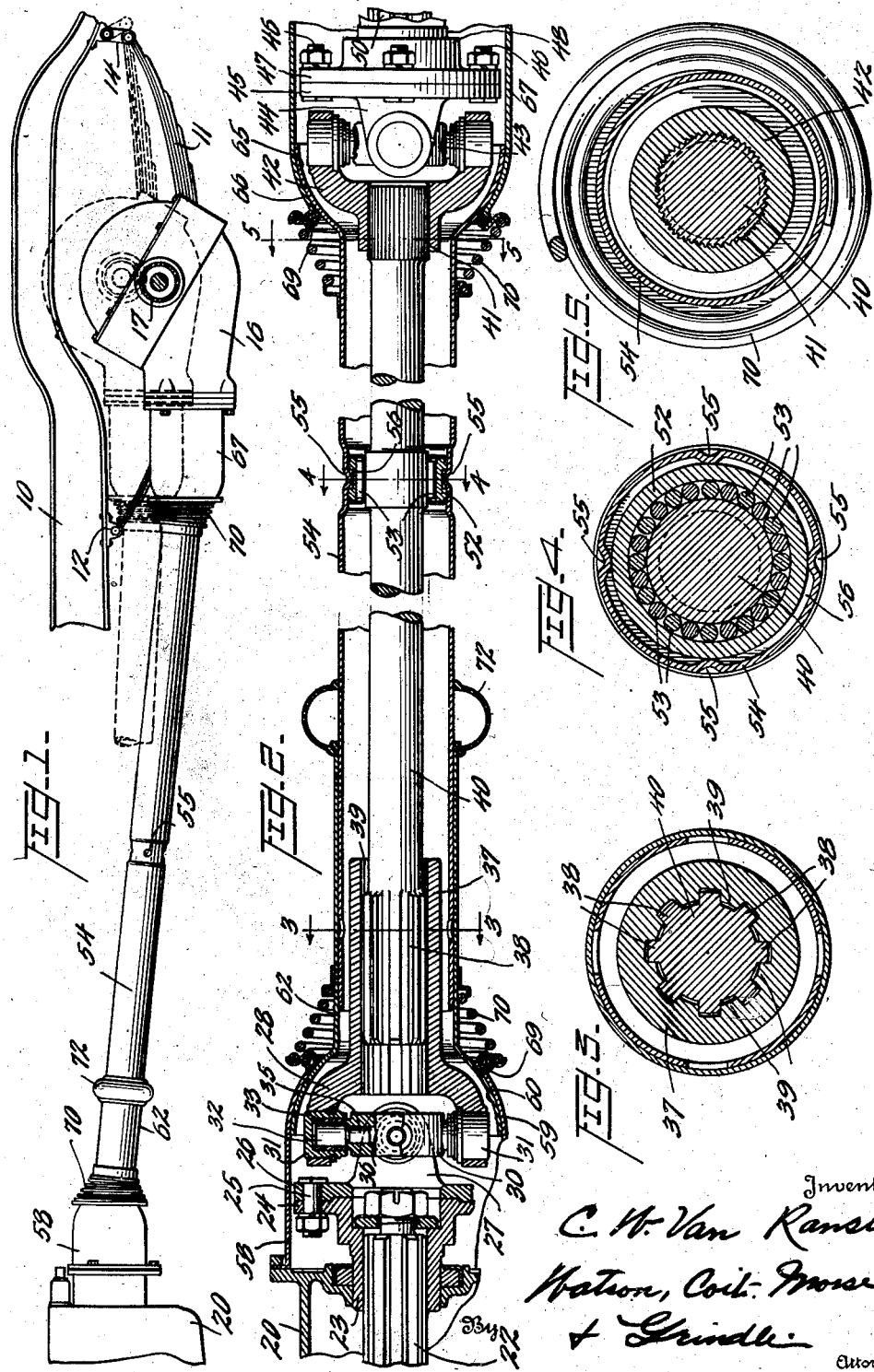

Patented Jan. 7, 1936

2,027,329

UNITED STATES PATENT OFFICE 2,027,329

MOTOR VEHICLE

Cornelius W. Van Ranst, Detroit, Mich., assignor to Packard Motor Car Company, Detroit, Mich., a corporation of Michigan Application November 3, 1934, Serial No. 751,387

8 Claims. (Cl. 180—85)

This invention relates to motor vehicles and more particularly to motor vehicle drive systems. It is the principal object of the invention to provide a driving connection intermediate the motor and the driven road wheels of the vehicle affording greater flexibility of movement and characterized by smoother operation and less vibration than have heretofore been attained.

The invention is especially applicable to that type of vehicle drive employing a relatively long drive shaft extending between universal joints disposed respectively adjacent the transmission and differential housings, whereby the torque applied to the differential housing is resisted principally by the vehicle springs, drive systems of this type being commonly referred to as the Hotchkiss type of drive. In order that this drive shaft may absorb shock and vibrational disturbances, and cushion the heavy stresses which would otherwise be transmitted therethrough, the present invention contemplates the employment of a shaft of high torsional elasticity, for instance a shaft of a diameter substantially less than ordinarily employed. The invention also contemplates the provision of means affording an additional support for the drive shaft to prevent lateral bending or whipping thereof, the support being so constructed as to offer no interference with the normal relative movement of the several elements of the drive system during operation of the vehicle, while permitting the use of a drive shaft having the maximum degree of torsional flexibility.

Further objects and features of the invention will be apparent from the following description taken in connection with the accompanying drawing, in which:

Figure 1 is a side elevation of a vehicle drive system constructed in accordance with the present invention;

Figure 2 is a longitudinal sectional view on a larger scale of the drive shaft and associated parts; and Figures 3, 4, and 5 are enlarged transverse sectional views taken substantially on the lines 3—3, 4—4, and 5—5 respectively of Figure 2.

In order to simplify the description and facilitate an understanding of the invention, reference is made to the embodiment of the invention illustrated in the accompanying drawing and specific language is employed herein. It will nevertheless be understood that no limitation of the scope of the invention is thereby intended and that various alterations of the details of the structure shown and described are contemplated.

Referring first to Figure 1 of the drawing in which the general arrangement of the drive system is disclosed, it will be observed that a portion of the side rail of the vehicle frame is shown at 10, this rail affording a support for a longitudinally extending leaf spring 11, the latter being pivoted at its forward end to a bracket 12 carried by the frame and being connected at its rear end to the frame by a shackle 14 so as to permit longitudinal movement of the rear end of the spring as the latter is flexed. The spring 11 carries the differential housing 16, being secured in any conventional manner to one of the axle housings 17, it being understood that the construction is duplicated at opposite sides of the vehicle.

A transmission housing 20 is located forwardly in the vehicle frame and supported therein in any suitable manner. A shaft 22, associated with and driven by gearing within the transmission housing 20 in the conventional manner, extends through the rear wall of the transmission housing 20 and is splined or otherwise secured to a sleeve 23, the latter being provided with an annular flange portion 24 which is secured by bolts 25 to the flange portion 26 of one member 27 of a universal joint.

This universal joint may be of any conventional type; as shown in the drawing it comprises essentially the yoke shaped members 27 and 28 and an intermediate member 30 of generally annular shape, the intermediate member 30 being pivotally connected to the arms of the yoke shaped members 27 and 28 at 90° intervals on axes disposed in a common transverse plane. Thus each of these pivotal connections may include a cup-shaped bearing member 31 secured in a corresponding opening in an arm of one of the yoke shaped members and a cooperating pin member 32 having a cylindrical portion received in a bushing 33 in the cup-shaped member 31, each pin member 32 having a radially directed portion 35 seated in an aperture 36 in the annular member 30. Any other type of universal joint functioning to rotatively connect the members 27 and 28 while permitting relative angular displacement of the axes of rotation thereof may be substituted for the joint illustrated herein.

The member 28 may be provided with a rearwardly directed sleeve portion 37 having a non-rotative and sliding engagement with a drive shaft 40. Conveniently the desired engagement between the shaft 40 and the sleeve 37 may be afforded by cooperating splines 38 and 39 as illustrated in the drawing.

At its rear end the drive shaft 40 is secured rigidly as at 41 within an opening in a yoke shaped member 42, the latter constituting one element of a universal joint which may be constructed similarly to that hereinbefore described so as to comprise an intermediate annular member 43 and a driven yoke shaped member 44, the latter having a flange portion 45 secured by means of bolts 46 to a corresponding flange portion 47 of the member 48, the member 48 being in turn secured to a shaft 50 extending within the differential housing 16 and operatively associated with the differential gearing therein in the conventional manner.

The construction thus far described comprises the Hotchkiss type of drive, the differential housing and associated parts being permitted to rise and fall bodily with respect to the frame, in other words without any substantial rocking movement, the nature of the displacement of which the differential housing partakes being indicated in full and dotted line positions in Figure 1. Owing to the provision of universal joints at each end of the drive shaft 40 and to the absence of torque arms or torque tubes or the like, the tendency of the differential housing to rotate about a transverse axis by reason of the torque transmitted through the gearing therein is resisted principally by the supporting leaf springs 11. It is obvious that various changes may be made in this type of drive without materially altering the function of the different parts thereof; as an example, the sliding connection afforded between the sleeve 37 and the shaft 40 may be located instead at the rear end of the shaft 40 and between the shaft and the member 42, it being only necessary to provide for telescoping action of the elements of the drive system in response to rise and fall of the differential housing with respect to the frame.

It is an important feature of the invention that the shaft 40 is so constructed as to provide considerable torsional flexibility; for instance the diameter of the shaft may be reduced to an extent sufficient to permit substantial torsional flexure between the ends thereof. Such a construction permits of the absorption by the shaft 40 of high stresses and shock resulting from momentary peak loads developed by the engine, and materially reduces the transmission of vibration through the drive system. Noticeable improvement in smoothness of operation of the vehicle is consequently secured. However, any increase in the torsional flexibility of the shaft gives rise to corresponding increased lateral flexibility; and whipping of the shaft such as would defeat the purposes of the invention may develop if additional bearing support is not provided. In drive systems of this type, the drive shaft 40 is necessarily of considerable length to avoid excessive angular displacement of the several parts of the drive during operation of the vehicle, and the drive shaft is normally supported only at the differential and transmission housings. It is therefore essential to so support the shaft that the normal action of the several elements of the drive system is not disturbed and so that the torsional flexibility of the shaft may be fully effective.

For this purpose I prefer to provide means extending between and supported on the differential and transmission housings and having a bearing engagement with the drive shaft intermediate the ends thereof, this means preferably having articulated connection with each of the housings on the axes of the associated universal joints of the drive system.

In the preferred embodiment of the invention a bearing 52, preferably of the anti-friction type having rollers 53, is supported in a tubular housing 54 surrounding the drive shaft. This housing may be deformed as at 55 to provide re-entrant portions engaged in an annular groove 56 in the bearing 52 to retain the latter against unintentional displacement within the housing.

A housing 58 secured to the rear of the transmission housing 20 is provided with a portion of generally spherical contour 59 in which is received a corresponding spherically shaped portion 60 of a tubular sleeve 62, the latter telescoping with the tubular housing 54 to form a longitudinally sliding joint therebetween. At its rear end the tubular housing 54 may be formed to provide a spherical portion 65 which is received within a complementary spherical portion 66 of a housing 67 secured to the differential housing 16. The construction is generally similar at each end of the vehicle, the cooperating spherical portions of the drive shaft housing being constructed to permit rocking movement about axes coinciding substantially with the axes of the associated universal joints. Packing elements 69 retained in position by coil springs 70 may be employed to seal the rocking joints of the drive shaft housing, and a flexible annular strip 72, for instance of fabric or rubber, may extend between and be secured to the sleeve 62 and the housing 54 to prevent ingress of dirt and loss of lubricant. As in the case of the drive shaft, the sliding or telescoping portion of the housing 54 may be arranged at any convenient point intermediate the ends thereof, it being only necessary that the housing is permitted to extend longitudinally and to rock in a generally vertical plane in correspondence with the movement executed by the drive shaft 40 during operation of the vehicle.

Since the housing 54 is supported independently of the drive shaft, any tendency of the shaft 40 to whip is adequately resisted by the bearing 52, the stresses being carried directly to the transmission and differential housings at opposite ends of the shaft. The drive shaft remains as free to flex torsionally as if it were wholly unsupported and by reason of the fact that the housing 54 does not rotate with the shaft, no centrifugal forces are developed therein such as would tend to unbalance the shaft and initiate lateral vibration thereof.

In drive systems of this character employing universal joints of the type approved by ordinary automotive practice, rising and falling of the driving road wheels of the vehicle with respect to the frame obviously results in concurrent slight variation of the speed of rotation of the drive shaft as the result of the action of the universal joints when the latter are flexed. This slight variation in the speed of rotation is readily absorbed by the employment of a torsionally flexible shaft such as that described herein and correspondingly increased smoothness of action is obtained.

Having thus described the invention, what is claimed as new and desired to be secured by Letters Patent is:

1. In a drive system for motor vehicles, the combination with transmission and differential housings, of a drive shaft extending between said housings and having universal joint connections at each end thereof with the gearing in the respective housings, said drive shaft being of sufficient length and sufficiently small diameter to afford substantial torsional flexibility and to offer insufficient resistance to whipping, and means supported independently of said drive shaft and having a bearing engagement with the latter intermediate the ends thereof for resisting lateral flexure of the shaft.

2. In a drive system for motor vehicles, the combination with transmission and differential housings, of a drive shaft extending between said housings and having universal joint connections at each end thereof with the gearing in the respective housings, said drive shaft being of sufficient length and sufficiently small diameter to afford substantial torsional flexibility and to offer insufficient resistance to whipping, and means supported independently of said drive shaft and having a bearing engagement with the latter intermediate the ends thereof for resisting lateral flexure of the shaft, said means including a housing surrounding said shaft and having articulated connection with said transmission and differential housings on the axes of said universal joints.

3. In a drive system for motor vehicles, the combination with transmission and differential housings, of a drive shaft extending between said housings and having universal joint connections at each end thereof with the gearing in the respective housings, said drive shaft being of sufficient length and sufficiently small diameter to afford substantial torsional flexibility and to offer insufficient resistance to whipping, and means supported independently of said drive shaft and having a bearing engagement with the latter intermediate the ends thereof for resisting lateral flexure of the shaft, said means including a housing surrounding said shaft and having articulated connection with said transmission and differential housings on the axes of said universal joints, said drive shaft and the housing therefor being longitudinally extensible.

4. In a drive system for motor vehicles including a transmission housing, a differential housing supported for substantially vertical bodily rising and falling movement, gearing in said housings, and a telescoping drive shaft having universal joint connections at each end thereof with said gearing, the combination with means extending between and supported by said transmission and differential housings and displaceable with said drive shaft and with respect to both said housings, of a bearing engaging said drive shaft and carried by said means.

5. In a drive system for motor vehicles including a transmission housing, a differential housing supported for substantially vertical bodily rising and falling movement, gearing in said housings, and a telescoping drive shaft having universal joint connections at each end thereof with said gearing, the combination with a telescoping housing surrounding said shaft and connected with said transmission and differential housings for swinging movement with said shaft, said housing having a bearing engagement with said shaft intermediate the ends of the latter.

6. In a drive system for motor vehicles including a transmission housing, a differential housing supported for substantially vertical bodily rising and falling movement, gearing in said housings, and a telescoping drive shaft having universal joint connections at each end thereof with said gearing, the combination with a telescoping housing surrounding said shaft and connected with said transmission and differential housings for swinging movement with said shaft, of a bearing carried by said housing and engaging said shaft intermediate the ends thereof, said housing being crimped to interlock with said bearing to retain the latter in position.

7. In a motor vehicle, a longitudinally extending drive shaft having spaced universally jointed portions and an intermediate, torsionally flexible, telescoping portion, a bearing constituting the sole bearing support for said intermediate shaft portion, and means independent of said intermediate shaft portion for supporting said bearing.

8. In a motor vehicle, a longitudinally extending drive shaft having spaced universally jointed portions and an intermediate, torsionally flexible, telescoping portion, a bearing affording a support for said intermediate shaft portion, and means independent of said intermediate shaft portion for supporting said bearing.

CORNELIUS W. VAN RANST.